United States Patent [19]

Orlowski

[11] 4,175,752

[45] Nov. 27, 1979

[54] TWO STAGE LABYRINTH PATTERN INCLUSION DEVICE

[75] Inventor: David C. Orlowski, Rock Island, Ill.

[73] Assignee: Inpro, Inc., Rock Island, Ill.

[21] Appl. No.: 854,827

[22] Filed: Nov. 25, 1977

[51] Int. Cl.² .............................................. F16J 15/44
[52] U.S. Cl. ..................................................... 277/53
[58] Field of Search ..................................... 277/52–56

[56] References Cited

U.S. PATENT DOCUMENTS

| | | | |
|---|---|---|---|
| 2,891,808 | 6/1959 | Richardson | 277/53 |
| 3,472,518 | 10/1969 | Harlan | 277/53 |
| 4,022,479 | 10/1977 | Orlowski | 277/53 |
| 4,114,902 | 9/1978 | Orlowski | 277/53 |

*Primary Examiner*—Robert I. Smith
*Attorney, Agent, or Firm*—Y. Judd Azulay

[57] ABSTRACT

There is disclosed an improved unitary sealing ring that is used on the shafts of rotating elements. The ring has first and second axial faces. The second face has a recess forming a flange therein. At least one annular groove extends along the inwardly radially extending surface. A first axially and longitudinally extending groove communicating between the annular groove or grooves and the axial face. A second longitudinally extending groove extends from the first face to the second face on the outer surface of said ring. The annular groove or grooves function as an oil groove or grooves and the axially and longitudinally extending grooves are designed to accumulate foreign particles that may be incursive with respect to the journalling means of a driving or driven device. These foreign particles are then expelled to the second axially and longitudinally extending groove due to the centrifugal force when the device is being operated.

5 Claims, 3 Drawing Figures

TWO STAGE LABYRINTH PATTERN INCLUSION DEVICE

BACKGROUND OF THE INVENTION

The present invention is deemed to be a considerable and meritorius improvement over the inventions disclosed in U.S. Pat. No. 4,022,479 and U.S. Ser. No. 840,374 filed Oct. 7, 1977. It is well known that in most industries it is extremely important that a seal be provided for bearings that support rotating shafts. These seals generally prevent the lubricants associated with the bearings from leaking externally of an associated housing or bearing support and also prevent foreign particles in the environment in which the shaft is rotating from working themselves through the seal and into the lubricant for the bearings.

The aforementioned patent incorporates the disclosure where there is taught a sealing ring structure which has as an object elimination of movement of a lubricant from the bearings to the outside of the housing. The sealing ring structure as disclosed also assists in eliminating the movement of foreign particles into the bearing area and lubricant area within the housing. Both the aforementioned patent and the aforementioned application disclose a sealing structure that is composed of two rings, preferably metal. In the structure disclosed in the patent one of the rings is fixed to the housing and the other is fixed to rotate with the shaft. The ring that is fixed to the housing has a labyrinth-type of seal against the shaft which discourages lubricant from moving outside the housing along the shaft. In the prior patent a joint was provided between the two rings which is composed of an annular recess in the first ring that opens axially outward of the housing and an annular flange adjoining the outer ring that faces the aforementioned annual recess in the first ring. The structure disclosed in the patent was also provided with a hole in the first sealing ring that communicates to the aforementioned recess. In this embodiment the annular flange of the second sealing ring had notches cut therein. With such an arrangement foreign particles that moved into a joint formed by the recess and flanges were scraped by the notches in the flanges to a hole where they were discharged back into the atmosphere over the area surrounding the housing. In the structure disclosed in the prior patent the first ring is, of course, fixed to the housing. The second ring is, of course, adapted to rotate with the shaft by suitable sealing means. However, in both instances there is no movement between the respective sealing rings and a portion of it is fixed to which would normally create wear if the opposite occurred.

SUMMARY OF THE INVENTION

The instant invention is an ingenious improvement over the device disclosed in the aforementioned patent and the pending application. The device of the instant invention consists of a single ring that has both an annular gap and a primary drain, and is primarily designed for inclusion of the lubricant within the bearing housing.

This type of seal is used in flour milling, steel milling, extrusion presses and anywhere where large bearings are used. The seal can be made in any size without any limitation on diameter. The uniqueness of the device resides in the fact that, by the addition of the annual gap, lubricant is prevented from entering on to the shaft for which it is used and thus lubricant cannot get into the flour, steel, or other material. It is obvious that lubricant is used in the bearing and is prevented by the seal from getting out of the bearing enclosure.

Thus the two unique features of this device are a double stage and the absolute retention characteristic.

DESCRIPTION OF THE PREFERRED EMBODIMENT

Figure 1:
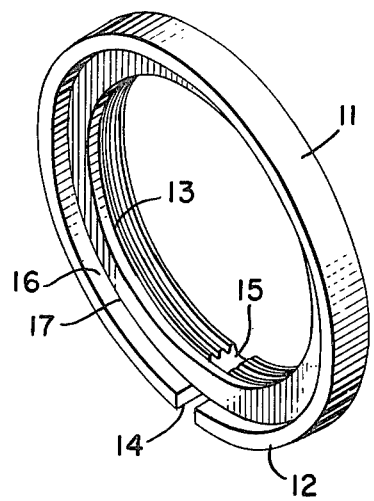
FIG. 1 shows a perspective view of the ring seal.

Referring first to FIG. 1 which shows the seal 11 with a first face 12 on the front of the flange 16 and the second face 17 on the rear of the flange 16. This figure also shows the longitudinal groove 14 that extends the full width of the ring seal structure and acts as a connection between the first and second stages, and the longitudinal groove 15 that extends the width of the annular grooves 13.

Figure 2:
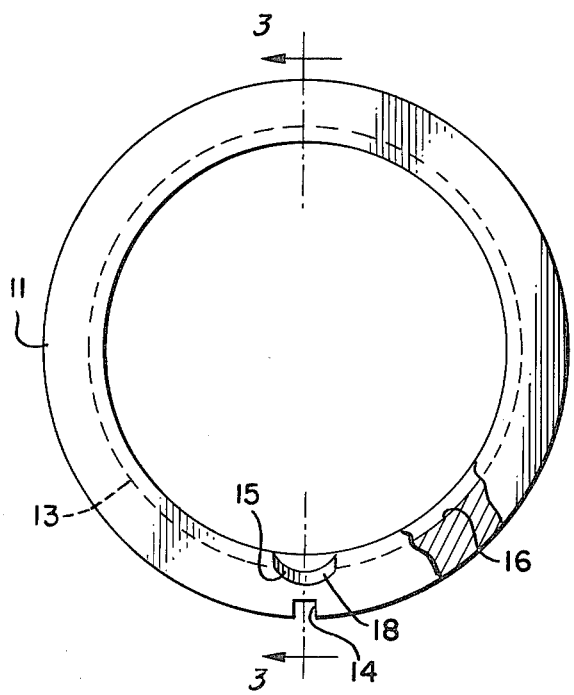
FIG. 2 is a cross-sectional view of the seal showing the relationship between the longitudinal groove here shown having a semi-circular configuration and the longitudinal groove here shown having a square configuration.

Referring now to FIG. 2 which is another view of the sealing ring 11 showing the annular grooves 13 in dotted lines, the flange 16 and the second stage groove having any configuration, i.e., square, round, semi-circular, etc. and here shown having a square configuration 14. It is apparent from this figure that the groove 14 extends the full width of the sealing ring 11. The details of the first stage longitudinal groove 15 having any configuration, i.e., square, round, semi-circular, etc., and here shown having a semi-circular configuration are also shown in this figure. It is apparent that the first stage groove 15 extends only the width of the annular grooves 13 and to the rear face 18 of the flange 16.

Figure 3:
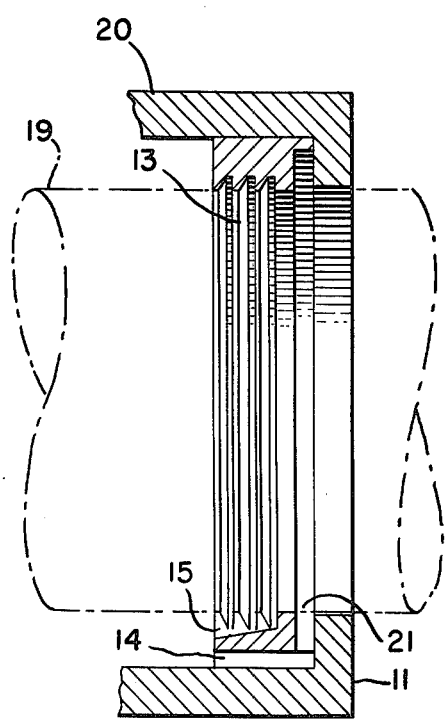
FIG. 3 is a vertical sectional view showing the improved sealing structure mounted relative to a shaft. The cross-section of the sealing structure is taken along the line 3—3 of FIG. 2.

Referring now to FIG. 3 there is shown an arrangement in which the sealing ring of the present invention may be employed. The sealing ring is shown in vertical cross-section taken along the line 3—3 of FIG. 2 mounted relative to a shaft 19. The shaft is provided with a bearing housing 20 into which the sealing ring is fitted. In order to prevent leakage of the lubricant from inside the housing 20 outwardly and leakage of foreign particles from outside the housing into the bearing and lubricant there is provided the sealing ring 11 with a series of annular channels 13 that function as oil grooves. The horizontal groove 15 shown having a semi-circular configuration acts as the primary drain and prevents oil from moving past. This drawing also shows the annular gap 21 which functions to finally eliminate the last traces of lubricant, i.e., that portion that has not been contained by the primary annular channel 13, from escaping. The horizontal groove 14 having a square, round or semi-circular configuration acts as a common drain to expel any lubricant collected in the primary horizontal groove 15 and any remaining traces of lubricant rotating with the shaft.

Thus the sealing ring of the instant application is a substantial improvement over the prior art in that it is a unitary structure that can act as an oil seal, as a grease seal, as a directional oil "mist" vent seal or a unique retrofit seal. Because of the design of the sealing ring it obviously has excellent wear properties.

What is claimed is:

1. A sealing ring comprising a ring member having a first axial face and a second opposite axial face, said second opposite axial face having an annular axially extending flange extending from the outer portion thereof, said ring member having an inner periphery having at least one annular groove, a first longitudinally extending groove in said inner periphery communicating between said at least one annular groove and said first axial face but not with said second face, said ring member having an outer periphery, said outer periphery having a second longitudinally extending groove extending from said first face to said opposite axial face including said flange.

2. The sealing ring of claim 1 wherein said annular grooves are at least two in number.

3. The sealing ring according to claim 1 wherein said first and second axially and longitudinally extending grooves are on the same radial line accurately lined.

4. The sealing ring according to claim 1 wherein said first axially and longitudinally extending groove is semi-circular in cross-section.

5. The sealing ring according to claim 1 wherein said second axially and longitudinally extending groove is rectangular in cross-section.

* * * * *